US010174186B2

(12) United States Patent
Berthold et al.

(10) Patent No.: US 10,174,186 B2
(45) Date of Patent: *Jan. 8, 2019

(54) POLYETHYLENE MOLDING COMPOSITION FOR PRODUCING BLOWN FILMS HAVING IMPROVED PROCESSABILITY

(71) Applicant: Basell Polyolefine GmbH, Wesseling (DE)

(72) Inventors: Joachim Berthold, Grassau (DE); Lutz-Gerd Heinicke, Eschborn (DE); Gerhardus Meier, Frankfurt (DE)

(73) Assignee: Basell Polyolefine GmbH, Wesseling (DE)

(*) Notice: Subject to any disclaimer, the term of this patent is extended or adjusted under 35 U.S.C. 154(b) by 67 days.

This patent is subject to a terminal disclaimer.

(21) Appl. No.: 15/154,800

(22) Filed: May 13, 2016

(65) Prior Publication Data
US 2016/0251504 A1 Sep. 1, 2016

Related U.S. Application Data

(63) Continuation of application No. 11/885,356, filed as application No. PCT/EP2006/060223 on Feb. 23, 2006, now abandoned.

(30) Foreign Application Priority Data

Mar. 1, 2005 (DE) .................. 10 2005 009 896

(51) Int. Cl.
*C08L 23/06* (2006.01)
*C08J 5/18* (2006.01)
*C08L 23/04* (2006.01)
*C08F 2/38* (2006.01)
*C08L 23/08* (2006.01)

(52) U.S. Cl.
CPC ............ *C08L 23/06* (2013.01); *C08J 5/18* (2013.01); *C08L 23/04* (2013.01); *C08L 23/0807* (2013.01); *C08L 23/0815* (2013.01); *C08J 2323/04* (2013.01); *C08J 2323/06* (2013.01); *C08J 2423/08* (2013.01); *C08L 23/08* (2013.01); *C08L 2203/16* (2013.01); *C08L 2205/025* (2013.01); *C08L 2205/03* (2013.01)

(58) Field of Classification Search
CPC .. C08F 110/02; C08L 23/06; C08L 2205/025; C08L 2205/03; C08J 5/18
USPC .......................................................... 526/352
See application file for complete search history.

(56) References Cited

U.S. PATENT DOCUMENTS

| 4,336,352 A | 6/1982 | Sakurai et al. |
| 4,447,587 A | 5/1984 | Berthold et al. |
| 4,461,873 A | 7/1984 | Bailey et al. |
| 4,536,550 A | 8/1985 | Moriguchi et al. |
| 4,859,749 A | 8/1989 | Franke |
| 5,258,161 A | 11/1993 | Ealer |
| 5,338,589 A | 8/1994 | Bohm et al. |
| 5,350,807 A | 9/1994 | Pettijohn et al. |
| 5,422,400 A | 6/1995 | Kamiyama et al. |
| 5,576,400 A | 11/1996 | Suga et al. |
| 5,648,309 A | 7/1997 | Bohm |
| 5,882,750 A | 3/1999 | Mink et al. |
| 6,136,924 A | 10/2000 | Promel |
| 6,156,845 A | 12/2000 | Saito et al. |
| 6,242,548 B1 | 6/2001 | Duchesne et al. |
| 6,248,831 B1 | 6/2001 | Maheshwari et al. |
| 6,329,054 B1 | 12/2001 | Rogestedt et al. |
| 6,344,522 B1 | 2/2002 | Promel |
| 6,407,185 B1 | 6/2002 | Promel |
| 6,642,323 B1 | 11/2003 | Myhre et al. |
| 6,713,561 B1 * | 3/2004 | Berthold ................. C08F 10/02 525/191 |
| 6,900,266 B2 | 5/2005 | Raty |
| 7,101,629 B2 | 9/2006 | Shannon et al. |
| 2003/0149180 A1 | 8/2003 | Van Dun et al. |
| 2006/0052542 A1 | 3/2006 | Berthold et al. |
| 2006/0074193 A1 | 4/2006 | Berthold et al. |
| 2006/0074194 A1 | 4/2006 | Berthold et al. |
| 2006/0155058 A1 | 7/2006 | Berthold et al. |

(Continued)

FOREIGN PATENT DOCUMENTS

| DE | 19945980 A1 | 3/2001 |
| DE | 10259491 A1 | 7/2004 |

(Continued)

OTHER PUBLICATIONS

Cornelia Vasile and Mihaela Pascu, Practical Guide to Polyethylene, Rapra Technology Limited, 2005, ISBN: 1-85957-493-9, p. 119 (Best available from parent U.S. Appl. No. 11/885,356).

(Continued)

*Primary Examiner* — Fred M Teskin

(57) ABSTRACT

The invention relates to a polyethylene molding composition having a multimodal molar mass distribution particularly suitable for blow molding films having a thickness in the range from 8 to 200 μm. The molding composition has a density at a temperature of 23° C. in the range from 0.953 to 0.960 g/cm³ and an $MFR_{190/5}$ of the final product after extrusion in the range from 0.10 to 0.50 dg/min. The composition comprises from 30 to 60% by weight of a first ethylene polymer fraction made of a homopolymer A having a first molecular weight, from 22 to 40% by weight of a second ethylene polymer fraction made of a further homopolymer or first copolymer B of ethylene and at least one first comonomer from the group of olefins having from 4 to 8 carbon atoms, the first copolymer B having a second molecular weight higher than the first molecular weight, and from 10 to 30% by weight of a third ethylene polymer fraction made of a second copolymer C having a third molecular weight higher than the second molecular weight. The molding composition of the invention allows to produce thin films having improved processability without impairing the mechanical properties.

11 Claims, No Drawings

(56) References Cited

U.S. PATENT DOCUMENTS

| | | |
|---|---|---|
| 2006/0178482 A1 | 8/2006 | Kwalk |
| 2008/0199674 A1 | 8/2008 | Berthold et al. |
| 2009/0105422 A1 | 4/2009 | Berthold et al. |

FOREIGN PATENT DOCUMENTS

| | | |
|---|---|---|
| EP | 68257 A1 | 1/1983 |
| EP | 129312 A1 | 12/1984 |
| EP | 401776 A2 | 12/1990 |
| EP | 492656 A1 | 7/1992 |
| EP | 603935 A1 | 6/1994 |
| EP | 905151 A1 | 3/1999 |
| EP | 1266738 A1 | 12/2002 |
| GB | 2056996 A | 3/1981 |
| WO | WO-9118934 A1 | 12/1991 |
| WO | WO-9618662 A1 | 6/1996 |
| WO | WO-9703124 A1 | 1/1997 |
| WO | WO-9703139 A1 | 1/1997 |
| WO | WO-200123446 A1 | 4/2001 |
| WO | WO-2004056921 A1 | 7/2004 |
| WO | WO-2004058876 A1 | 7/2004 |
| WO | WO-2004058877 A1 | 7/2004 |
| WO | WO-2004058878 A1 | 7/2004 |
| WO | WO-2006053740 A1 | 5/2006 |
| WO | WO-2006053741 A1 | 5/2006 |

OTHER PUBLICATIONS

M. Fleißner, Langsames Rißwachstum und Zeitstandfestigkeit von Rohren aus Polyethylen, Kunststoffe Hoechst, v. 77, p. 45-50 (1987). (With English Translation of the Text) (Best available from parent application No. 11/885,356).

* cited by examiner

POLYETHYLENE MOLDING COMPOSITION FOR PRODUCING BLOWN FILMS HAVING IMPROVED PROCESSABILITY

This application is a continuation application of U.S. patent application Ser. No. 11/885,356, which is the U.S. National Phase of PCT International Application PCT/EP2006/060223, filed Feb. 23, 2006, claiming benefit of priority to German Patent Application No. 102005009896.7, filed Mar. 1, 2005, the disclosures of which are incorporated herein by reference in their entirety.

FIELD OF THE INVENTION

The present invention relates to a polyethylene (PE) molding composition having a multimodal molar mass distribution, i.e. a molding composition comprising a plurality of ethylene polymer fractions having distinct molar masses.

In the present description and in the following claims, unless otherwise indicated, the term "polymer" is used to indicate both a homopolymer, i.e. a polymer comprising repeating monomeric units derived from equal species of monomers, and a copolymer, i.e. a polymer comprising repeating monomeric units derived from at least two different species of monomers, in which case reference will be made to a binary copolymer, to a terpolymer, etc. depending on the number of different species of monomers used.

The multimodal PE molding composition of the invention is particularly useful for producing blown films.

The invention also relates to a process for preparing this PE molding composition.

The invention further relates to a blown film produced from the above-mentioned molding composition by a blown film process.

PRIOR ART

Polyethylene is used on a large scale for producing films by a blown film extrusion process thanks to the mechanical strength, processability, good chemical resistance and low intrinsic weight of polyethylene. So, for example, EP-A-0 603 935 describes a molding composition based on polyethylene which has a bimodal molar mass distribution and is suitable for producing films and moldings having good mechanical properties.

However, the prior art films made of bimodal polyethylene have an inadequate processability, in particular in terms of bubble stability during processing, and an insufficient drawing capability. Attempts to attain an improved bubble stability inevitably resulted in an unacceptable worsening of the mechanical properties, particularly in terms of Dart Drop Impact strength (DDI), which is determined in accordance with ASTM D 1709, method A.

SUMMARY OF THE INVENTION

The technical problem underlying the present invention is therefore that of providing a novel PE molding composition having an improved processability in the blown film extrusion process without impairing the mechanical strength, particularly in terms of DDI. More in particular, the mechanical strength of films produced from the novel PE molding composition of the invention, expressed as DDI, should not be lower than 280 g for a film having a thickness of 20 μm.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The above-mentioned technical problem is solved by a PE molding composition having a multimodal molar mass distribution, a density at a temperature of 23° C. in the range from 0.953 to 0.960 g/cm$^3$ and a MFR$_{190/5}$ of the final product after extrusion in the range from 0.10 to 0.50 dg/min, the polyethylene molding composition comprising:
  from 30 to 60% by weight of a first ethylene polymer fraction made of an ethylene homopolymer A having a first molecular weight,
  from 22 to 40% by weight of a second ethylene polymer fraction made of a further homopolymer or first copolymer B of ethylene and at least one first comonomer from the group of olefins having from 4 to 8 carbon atoms, said first copolymer B having a second molecular weight higher than said first molecular weight, and
  from 10 to 30% by weight of a third ethylene polymer fraction made of a second copolymer C of ethylene and at least one second comonomer, said second copolymer C having a third molecular weight higher than said second molecular weight,
  all percentages being based on the total weight of the molding composition.

In the present description and in the following claims, the melt flow rate MFR$_{190/5}$ is the melt flow rate measured in accordance with ISO 1133 at 190° C. and under a load of 5 kg. The density is determined in accordance with ISO1183.

Advantageously, the films produced from the novel PE molding composition of the invention have a better bubble stability, a reduced melt pressure and adequate mechanical properties when compared to the prior art films, in the sense that the DDI is above 280 g for a film having a thickness of 20 μm.

The polyethylene molding composition of the invention has a density at a temperature of 23° C. in the range from 0.953 to 0.960 g/cm$^3$, preferably from 0.955 to 0.959 g/cm$^3$, and a broad trimodal molar mass distribution.

According to a preferred embodiment of the invention, the polyethylene molding composition comprises:
  from 42 to 52% by weight of the first ethylene polymer fraction, i.e. of the homopolymer A,
  from 27 to 38% by weight of the second ethylene polymer fraction, i.e. of a further homopolymer or of the first copolymer B, and
  from 15 to 25% by weight of the third ethylene polymer fraction, i.e. of the second copolymer C.

The second copolymer B preferably contains, in addition to ethylene, predetermined proportions, preferably from 0.1 to 1.0% by weight based on the weight of the second copolymer B, of at least one first olefin comonomer having from 4 to 8 carbon atoms.

Examples of such comonomer(s) are 1-butene, 1-pentene, 1-hexene, 1-octene and 4-methyl-1-pentene and mixture thereof.

In an analogous manner, the second copolymer C is preferably a copolymer of ethylene and of at least one second comonomer preferably selected from the group of olefins having from 4 to 8 carbon atoms, more preferably from the above-mentioned list of comonomers.

Preferably, the at least one second comonomer is present in an amount of from 1 to 15% by weight, based on the weight of the second copolymer C.

Furthermore, the PE molding composition of the invention has a melt flow rate $MFR_{190/5}$ of the final product after extrusion in accordance with ISO 1133, in the range from 0.10 to 0.50 g/10 min, preferably from 0.32 to 0.42 g/10 min.

Preferably, the PE molding composition of the invention has a viscosity number $VN_3$, measured in accordance with ISO/R 1191 in decalin at a temperature of 135° C., in the range from 270 to 400 cm$^3$/g, in particular from 320 to 400 cm$^3$/g.

If, as provided by a preferred embodiment of the invention described more in detail in the following, the PE molding composition is prepared by means of a cascaded polymerization process comprising at least three successive polymerization stages comprising a first stage, a second stage and a third stage, the trimodality of the composition of the invention can be described in terms of viscosity numbers VN, measured in accordance with ISO/R 1191, of the ethylene polymer fractions formed in the different subsequent polymerization stages.

Here, the different viscosity numbers will be indicated as explained in the following.

The viscosity number $VN_1$ shall be used to indicate the viscosity number measured on the polymer after the first polymerization stage. The viscosity number $VN_1$ is identical to the viscosity number $VN_A$ of the homopolymer A.

According to a preferred embodiment of the invention, the viscosity number $VN_1$ is in the range from 60 to 110 cm$^3$/g, more preferably from 60 to 110 cm$^3$/g.

The viscosity number $VN_2$ shall be used to indicate the viscosity number measured on the polymer after the second polymerization stage. The viscosity number $VN_2$ is therefore the viscosity number of the mixture of homopolymer A plus further homopolymer or first copolymer B. The viscosity number of the further homopolymer or of the first copolymer B formed in the second polymerization stage can be instead determined only mathematically.

According to a preferred embodiment of the invention, the viscosity number $VN_2$ is in the range from 250 to 400 cm$^3$/g, preferably from 300 to 370 cm$^3$/g.

The viscosity number $VN_3$ shall be used to indicate the viscosity number measured on the polymer after the third polymerization stage. The viscosity number $VN_3$ is therefore the viscosity number of the mixture of homopolymer A plus further homopolymer or first copolymer B plus second copolymer C. The viscosity number of the second copolymer C formed in the third polymerization stage can be instead determined only mathematically.

According to a preferred embodiment of the invention, the viscosity number $VN_3$ is in the range from 270 to 400 cm$^3$/g, in particular from 320 to 440 cm$^3$/g.

The PE molding composition of the invention may further comprise additional additives. Such additives may be, for example, heat stabilizers, anti-oxidants, UV stabilizers, light stabilizers, metal deactivators, peroxide-destroying compounds, basic co-stabilizers in amounts of from 0 to 10% by weight, preferably from 0 to 5% by weight, but also fillers, reinforcing materials, plasticizers, lubricants, emulsifiers, pigments, optical brighteners, flame retardants, antistatics, blowing agents or combinations of these in total amounts of from 0 to 50% by weight, based on the total weight of the composition.

The present invention also relates to a process for preparing a polyethylene molding composition as described above, comprising the step of polymerizing ethylene, said at least one first comonomer and said at least one second comonomer in suspension at a temperature preferably in the range from 20 to 120° C., more preferably from 70 to 90° C. and, still more preferably, from 80 to 90° C., and at a pressure preferably in the range from 2 to 10 bar and, preferably, in the presence of a Ziegler catalyst.

The process for preparing the PE molding composition is preferably carried out in the presence of a catalytic system comprising a highly active Ziegler catalyst comprising a transition metal compound and a co-catalyst, preferably an organo-aluminum compound, by means of a multistage reaction sequence comprising at least three successive polymerizations.

Preferably, the polymerization is carried out in multiple successive polymerization stages comprising a first stage, a second stage, and a third stage performed in corresponding multiple reactors comprising a first reactor, a second reactor and a third reactor arranged in series.

The polymerization is preferably carried out in a cascaded suspension polymerization as described in EP-A-1 228 101.

The molar mass in each polymerization stage is preferably adjusted by means of a chain transfer agent, preferably hydrogen, and preferably in such a manner that the above-mentioned preferred values of viscosity numbers are obtained after each polymerization stage.

The PE molding composition of the invention is particularly suitable for the production of blown films by the blown film extrusion process. A possible way to carry out such process is detailed in the following.

The polyethylene molding composition is preferably firstly plasticized at temperatures in the range from 200 to 250° C. in an extruder. Subsequently, the plasticized polyethylene is extruded in the molten state through an annular die so as to form a bubble having a substantially tubular form. The bubble is cooled, preferably by means of compressed air, and subsequently collapsed by means of rollers and rolled up into a film.

The molding composition of the invention can be processed particularly well by the film blowing process because this composition ensures an improved drawing capability and an adequate film bubble stability even under the typical processing conditions of large scale industrial plants. In other words, thanks to the drawing capability, particularly thin films having a regular and constant thickness may be produced.

Thanks to the bubble stability, the film bubble coming out from the annular die remains stable even at high take-off speeds and shows no tendency to alter its geometry neither in axial direction nor in radial direction. Preferably, the bubble has a frost line delimiting the molten material from the solidified material oscillating not more than ±2 cm in axial direction during the shock test (performed as detailed in following Example 3) at a maximal take-off speed.

The invention further relates to a film comprising a PE molding composition as described above and having a thickness in the range from 8 to 200 μm, preferably from 10 to 100 μm, more preferably from 8 to 50 μm and, still more preferably, from 8 to 10 μm. Preferably, the DDI of a film having a thickness of 20 μm is higher than 280 g.

DETAILED DESCRIPTION OF THE PREFERRED EMBODIMENTS

The present invention will be further described by means of the following preferred embodiments without restricting the scope of the invention.

Example 1: Polymerization (Invention)

Ethylene was polymerized in a continuous process performed in a cascaded mode in three reactors reciprocally arranged in series. A Ziegler catalyst prepared by the method of EP-A 401 776, Example 1, was used, having an extremely high responsiveness to hydrogen and an activity sufficient to carry out the cascaded polymerization, since this catalyst was able to maintain the activity over a long period, from 1 to 8 hours.

The catalyst had in particular the following analytical composition:

Ti 6.2% by weight
Mg 70.8% by weight
Cl 23.0% by weight.

The catalyst was pre-activated by means of a sufficient amount of triethylaluminum and then fed into a first reactor in an amount of 4.8 mmol/h.

Sufficient suspension medium, in particular hexane, ethylene and hydrogen were additionally fed in the first reactor. The amount of ethylene (=46 kg/h) and the amount of hydrogen (=55 g/h) were set in such a manner that a percentage of 16.8% by volume of ethylene and a percentage of 68% by volume of hydrogen were measured in the gas space (gas temperature for the analytical measurement=5±1° C.) of the first reactor. The remainder was a mixture of nitrogen and vaporized suspension medium.

The polymerization in the first reactor was carried out at a temperature of 84° C. and under a pressure of 8.8 bar, corresponding to 0.88 MPa.

The suspension from the first reactor was then conveyed into a second reactor arranged in series with and downstream of the first reactor. The percentage of hydrogen in the gas space (gas temperature for the analytical measurement=5±1° C.) in the second reactor was reduced to 8.6% by volume by means of an intermediate $H_2$ depressurization. An amount of 30.7 kg/h of ethylene together with a very small amount of a first comonomer, namely 1-butene, were introduced into the second reactor. 62.5% by volume of ethylene, 8.6% by volume of hydrogen and 0.4% by volume of 1-butene were measured in the gas space of the second reactor; the remainder was a mixture of nitrogen and vaporized suspension medium.

The polymerization in the second reactor was carried out at a temperature of 84° C. and under a pressure of 2.7 bar, corresponding to 0.27 MPa.

The suspension from the second reactor was conveyed via a further intermediate depressurization operated without off-gas into a third reactor arranged in series with and downstream of the second reactor.

The hydrogen concentration was set to 14.6% by volume in the gas space by introducing hydrogen. Apart from 19.2 kg/h of ethylene, 240 g/h of a second comonomer equal to the first comonomer introduced in the second stage, namely 1-butene, and 6.9 g/h of hydrogen were additionally introduced into the third reactor.

A percentage of ethylene of 66% by volume, a percentage of hydrogen of 14.6% by volume and a percentage of 1-butene of 1% by volume were measured in the gas space of the third reactor (gas temperature for the analytical measurement=5±1° C.); the remainder was a mixture of nitrogen and vaporized suspension medium.

The polymerization in the third reactor was carried out at a temperature of 84° C. and under a pressure of 3 bar, corresponding to 0.3 MPa.

The suspension medium was separated off from the polymer suspension leaving the third reactor and the powder was dried and passed to pelletization.

The polyethylene molding composition prepared as described above had a density of 0.957 g/cm³, viscosity numbers $VN_1$, $VN_2$ and $VN_3$, proportions $w_A$, $w_B$ and $w_C$ of the homopolymer A, of the first copolymer B and, respectively, of the second copolymer C and melt flow rates $MFR_1$, $MFR_2$ and $MFR_3$ which are reported in Table 1 below.

TABLE 1

| Example | 1 |
|---|---|
| $w_A$ [% by weight] | 48 |
| $w_B$ [% by weight] | 32 |
| $w_C$ [% by weight] | 20 |
| $VN_1$ [cm³/g] | 81 |
| $VN_2$ [cm³/g] | 337 |
| $VN_3$ [cm³/g] | 365 |
| $MFR_{1(190° C./1.2 kg)}$ [g/10 min] | 85 |
| $MFR_{2(190° C./5 kg)}$ [g/10 min] | 1.1 |
| $MFR_{3(190° C./5 kg)}$ [g/10 min] | 0.65 |
| $MFR_{pellets(190° C./5 kg)}$ [g/10 min] | 0.39 |

The abbreviations for the physical properties in Table 1 have the following meanings: $w_A$, $w_B$, $w_C$=proportion of homopolymer A, first copolymer B and, respectively, second copolymer C in the total molding composition=reactor split, determined by the amount of ethylene fed into the respective reactor;

$VN_1$, $VN_2$, $VN_3$=viscosity number of the polymer leaving the first, second and, respectively, third reactor measured in accordance with ISO/R 1191 in decalin at a temperature of 135° C.;

$MFR_1$, $MFR_2$, $MFR_3$=melt flow rate of the polymer leaving the first, second and, respectively, third reactor, measured in accordance with ISO 1133 with indication of the temperature and the load;

$MFR_{pellets}$=melt flow rate of the final product after extrusion.

Example 2: Film Preparation (Invention)

From the molding composition so prepared, a film was produced in the following way.

A film having a thickness of 20 μm was produced on an Alpine film blowing plant comprising an extruder with a diameter $d_1$ of 50 mm and a length of $21 \times d_1$ (=1.05 m) and an annular die having a diameter $d_2$ of 120 mm and a gap width of 1 mm. The film was produced at a blow-up ratio of 4:1 and a neck length of $7.5 \times d_2$ (=90 cm). The melt temperature of the molding composition in the extruder was 205-210° C.

The film properties are shown in Table 2 below.

Example 3: Film Preparation (Comparison)

A 20 μm film was produced using a commercial film raw material from Borealis, which is commercially available under the designation FS 1560, on the same plant and under the same conditions described in Example 2 with the exception that the melt temperature of the molding composition in the extruder was 205-215° C.

The film properties are shown in Table 2 below.

TABLE 2

| | Example 2 (invention) | Example 3 (comparison) |
|---|---|---|
| Take-off: 58 m/min | + | + |
| Shock test: | + | + |
| Take-off: 63 m/min | + | + |
| Shock test: | + | − |
| Take-off: 70 m/min | + | − |
| Shock test: | + | − |

TABLE 2-continued

|  | Example 2 (invention) | Example 3 (comparison) |
|---|---|---|
| Take-off: 77 m/min | + | − |
| Shock test: | + | − |
| Take-off: 87 m/min | + | − |
| Shock test: | + | − |
| DDI [g] | 290 | 310 |
| Specks | No specks | high specks count |
| Melt pressure [bar] | 330 | 340 |

More in particular, the film bubble stability was determined by the following procedure, including a preliminary test and a shock test as detailed below.

In the preliminary test, the take-off speed was set at predetermined increasing take-off speeds, namely ar 58, 63, 70, 77 and 87 m/min (=maximum rolling-up speed). After the respective take-off speed had been attained and the neck length had been adjusted to 90 cm by adjusting the cooling air blower, the axial oscillation of the film bubble was observed.

The test was considered finished and passed at a given speed if the axial oscillation of the bubble being formed was in the range of ±2 cm over a period of observation of one (1) minute.

The shock test was subsequently carried out at the same take-off speed setting as in the preliminary test. In the shock test, the bubble was made axially oscillate. This was performed by fully opening the iris of the cooling air blower for a period of about 7 s. The iris was then reset to the initial position. The opening and closing of the iris was monitored via the pressure of the cooling air. At room temperature greater than 25° C., however, the opening of the above-mentioned iris alone is not sufficient to set the film bubble into oscillation. Accordingly, at temperatures greater than 25° C., the iris was firstly opened and then shut completely for a maximum of 3 s, after which it was reset to the initial position, always monitoring by means of the air pressure. The shock test was considered passed at a given take-off speed if the oscillations of the film bubble had abated to ±2 cm within 2 minutes.

This was made for each one of the above-mentioned increasing take-off speeds. If the shock test or the preliminary test was not passed at a particular take-off speed, the stability grade corresponding to the previous lower take-off speed was awarded.

The dart drop impact strength of the films was determined according to the standard ASTM D 1709, method A.

The assessment of specks was carried out visually.

What is claimed is:

1. A polyethylene molding composition having a multimodal molar mass distribution, a density at a temperature of 23° C. of 0.955-0.960 g/cm$^3$ and a MFR$_{190/5}$ of the final product after extrusion of 0.10-0.50 dg/min comprising:
    30-60% by weight of a first ethylene polymer fraction made of an ethylene homopolymer A having a first molecular weight and having a viscosity number, VN$_1$, from 60 to 110 cm$^3$/g,
    22-40% by weight of a second ethylene polymer fraction made of a further homopolymer or first copolymer B of ethylene and at least one first comonomer from the group of olefins having 4-8 carbon atoms, the first copolymer B having a second molecular weight higher than the first molecular weight and having a viscosity number, VN$_2$, from 250 to 400 cm$^3$/g, and
    10-30% by weight of a third ethylene polymer fraction made of a second copolymer C of ethylene and at least one second comonomer, the second copolymer C having a third molecular weight higher than the second molecular weight and having a viscosity number, VN$_3$, from 270 to 400 cm$^3$/g,
    wherein all weight percentages are based on the total weight of the molding composition.

2. The polyethylene molding composition of claim 1, comprising:
    42-52% by weight of the first ethylene polymer fraction,
    27-38% by weight of the second ethylene polymer fraction, the first copolymer B comprising 0.1-1.0% by weight, based on the weight of copolymer B, of the at least one first comonomer, and
    15-25% by weight of the third ethylene polymer fraction, the second copolymer C comprising 1-15% by weight, based on the weight of the second copolymer C, of the at least one second comonomer.

3. The polyethylene molding composition of claim 1, wherein the first and second comonomers are independently selected from the group consisting of 1-butene, 1-pentene, 1-hexene, 1-octene, 4-methyl-1-pentene and mixtures thereof.

4. The polyethylene molding composition of claim 1, wherein the density is 0.955-0.959 g/cm$^3$ and the MFR$_{190/5}$ of the final product after extrusion is 0.32-0.42 g/10 min.

5. The polyethylene molding composition of claim 4, comprising a viscosity number VN$_3$, measured in accordance with ISO/R 1191 in decalin at a temperature of 135° C., of 320 to 400 cm$^3$/g.

6. A process for preparing the polyethylene molding composition of claim 1, comprising the step of polymerizing ethylene, the first comonomer and the second comonomer in a suspension at a temperature of 20-120° C. and a pressure of 2-10 bar in the presence of a Ziegler catalyst comprising a transition metal compound and an organo-aluminum compound.

7. The process of claim 6, wherein said polymerization step is carried out in multiple successive polymerization stages comprising a first stage, a second stage, and a third stage performed in corresponding multiple reactors comprising a first reactor, a second reactor and a third reactor arranged in series, the molar mass of the polyethylene composition prepared in each stage being adjusted in each case by means of hydrogen.

8. The process of claim 7, wherein the hydrogen concentration in the first polymerization stage is set in such a manner that the homopolymer A has a viscosity number VN$_1$ of 70-110 cm$^3$/g.

9. The process of claim 7, wherein the hydrogen concentration in the second polymerization stage is set in such a manner that the mixture of homopolymer A plus homopolymer or copolymer B has a viscosity number VN$_2$ of 300-370 cm$^3$/g.

10. The process of claim 7, wherein the hydrogen concentration in the third polymerization stage is set in such a manner that the mixture of homopolymer A plus first homopolymer or copolymer B plus second copolymer C has a viscosity number VN$_3$ of 280-400 cm$^3$/g.

11. A blown film comprising the polyethylene molding composition of claim 1, having a thickness of 8-200 μm and a dart drop impact (DDI) strength of more than 280 g as measured on a film having a thickness of 20 μm.

* * * * *